US008037041B2

(12) United States Patent
Gupta

(10) Patent No.: US 8,037,041 B2
(45) Date of Patent: Oct. 11, 2011

(54) SYSTEM FOR DYNAMIC KEYWORD AGGREGATION, SEARCH QUERY GENERATION AND SUBMISSION TO THIRD-PARTY INFORMATION SEARCH UTILITIES

(75) Inventor: Puneet K. Gupta, Newark, CA (US)

(73) Assignee: Alden Byird Investments, LLC, Wilmington, DE (US)

( * ) Notice: Subject to any disclaimer, the term of this patent is extended or adjusted under 35 U.S.C. 154(b) by 255 days.

(21) Appl. No.: 11/400,002

(22) Filed: Apr. 7, 2006

(65) Prior Publication Data
US 2006/0230015 A1    Oct. 12, 2006

Related U.S. Application Data

(60) Provisional application No. 60/670,422, filed on Apr. 11, 2005.

(51) Int. Cl.
*G06F 7/00* (2006.01)
(52) U.S. Cl. ........ 707/705; 707/706; 709/201; 715/200; 715/700

(58) Field of Classification Search .................. 707/705, 707/706; 709/201
See application file for complete search history.

(56) References Cited

U.S. PATENT DOCUMENTS

| | | | |
|---|---|---|---|
| 6,609,091 B1 * | 8/2003 | Budzinski | 704/9 |
| 7,890,526 B1 * | 2/2011 | Brewer et al. | 707/767 |
| 2001/0056374 A1 * | 12/2001 | Joao | 705/14 |
| 2004/0064438 A1 * | 4/2004 | Kostoff | 707/1 |
| 2004/0249790 A1 * | 12/2004 | Komamura | 707/3 |
| 2005/0229154 A1 * | 10/2005 | Hiew et al. | 717/110 |
| 2005/0283357 A1 * | 12/2005 | MacLennan et al. | 704/4 |

* cited by examiner

*Primary Examiner* — Don Wong
*Assistant Examiner* — Tuan-Khanh Phan
(74) *Attorney, Agent, or Firm* — Schwabe, Williamson & Wyatt, P.C.

(57) ABSTRACT

A system for creating keywords or phrases to be used for mining online information has a text source accessible by the system, a keyword aggregation function, and a mechanism for configuring the system. The system extracts keywords and phrases from the text source according to the configuration, for submission to a search facility.

22 Claims, 3 Drawing Sheets

_US 8,037,041 B2_

SYSTEM FOR DYNAMIC KEYWORD AGGREGATION, SEARCH QUERY GENERATION AND SUBMISSION TO THIRD-PARTY INFORMATION SEARCH UTILITIES

CROSS REFERENCE TO RELATED DOCUMENTS

The instant application claims priority to U.S. provisional application Ser. No. 60/670,422 filed on Apr. 11, 2005. The application is incorporated herein in it's entirety at by reference.

BACKGROUND OF THE INVENTION

1. Field of the Invention

The present invention is in the field of information search applications used on a information network to return data search results as a consequence of keyword or phrase input and pertains more particularly to a system for dynamic keyword or phrase aggregation on the client side and for automated submission thereof into a search engine interface causing return of keyword or phrase-relevant results.

2. Discussion of the State of the Art

In the field of information searching over a data network like the World Wide Web, for example, it is well known that any user operating a network-capable device hosting a browser application for network navigation may use a search engine interface provided within the browser application in order to search web-based sources for information relevant to information search criteria entered into the search interface and submitted to a host providing the interface. Well known examples of search providers include Altavista™, Google™, Yahoo™, Excite™, and others.

Data returned from an information-search submission of keyword, keywords, or a phrase is typically presented within the browser interface as an electronic search result page listing interactive hyperlinks that, when invoked, direct the browser to the page associated with the universal resource locator (URL) invoked by the link, which may be textual, graphic, audio, or video data depending upon options selected for data return when the search criteria is submitted from the search interface.

More recently, search providers have created special compilations of information that may be searched as a specific type or class of information. For example, a user may limit an information search to news stories only. One of the most noted classes of information that may now be exclusively searched are research related documents published by students, professors, authors, and other academia-related practitioners.

It has occurred to the inventor that a capability of exclusively searching for academia-related documents proves particularly useful to students who must perform some kind of research in order to obtain relevant information for completing assignments. Many of these students use laptops, computers, personal digital assistants, and even third-generation (3G) network-capable telephones to conduct such information searches.

A problem with such information searching activity is that it is often ad hoc and must be performed manually by the user when the user desires to perform the research. Likewise, it may require some skill to determine keywords, phrases, and the like that will return optimally relevant results that the user may actually use. Often keywords and phrases entered by a user with good intent cause return of many links to information that is not relevant to what the user was actually searching for. Therefore much time is wasted sifting through data and refining and resubmitting keywords for additional searches. The process can be quite frustrating to an untrained user, especially one not familiar with information search processes.

Therefore, what is clearly needed in the art is an electronic system and software that can compile lists of keywords or phrases from parsing such as existing course descriptions, assignment descriptions, and other computer inputs or created documents that may exist on a users network-capable device, and an do so without intervention from the user, and submit those keywords or phrases in one or a series of information search operations causing one or a series of returns of relevant results to a user interface.

SUMMARY OF THE INVENTION

In an embodiment of the present invention a system is provided for extracting keywords and phrases to be used for mining online information, comprising a text source accessible by the system, a keyword aggregation function, and a mechanism for configuring the system. The system extracts keywords and phrases from the text source according to the configuration, for submission to a search facility.

In one embodiment configuration includes nature of words or phrases to be selected as keywords or phrases for submission. Also in one embodiment the nature of words includes whether the words are nouns, verbs, adjectives or adverbs. Also in one embodiment configuration includes selecting words or phrases repeated in the text source.

In some embodiments of the system the text source may be a course schedule, including date or time constraints and the configuration prioritizes keyword or phrase extraction according to the date or time constraints. Also in some embodiments the text source may be a document, and the configuration manages keyword or phrase extraction according to specific portions of the document.

In some embodiments the specific portions may include sentences, paragraphs, pages or chapters. In other embodiments the text source may be a real-time typing mechanism. In some embodiments the configuration may manage keyword or phrase extraction by word, sentence, paragraph or page typed. In still other embodiments the configuration may manage keyword or phrase extraction by time periodicity.

In some embodiments there is a mechanism for submitting keywords and phrases extracted from the text source to a search facility, and the configuration may manage submissions by time periods or structural characteristics of the text source. The structural characteristics may include sentences, paragraphs, pages, chapters, or subheadings. In some instances the system may connected to the Internet network, and submissions to the search facility may be managed to occur in real time. In other instances keyword and phrase extraction may occur while the system is unconnected to the Internet, and submissions are managed to be made at times that the system is connected to the Internet.

In some embodiments there may be a mechanism for receiving and using results of searches done by the search facility using keywords or phrases extracted by the system, and in some cases the system may display links to Internet-connected information sources found as a result of a search. The text source may be a real-time typing mechanism, and the search results may be displayed proximate the typed text.

In another aspect of the invention a method for creating keywords or phrases to be used for mining online information is provided, comprising the steps of (a) configuring an extraction mechanism; (b) accessing a text source; and (c) extracting keywords or phrases from the text source according to configuration set in step (a). In step (a) configuration may include nature of words or phrases to be selected as keywords or phrases, and the nature of words may include whether the words are nouns, verbs, adjectives or adverbs. In some embodiments configuration may include selecting words or phrases repeated in the text source. The text source may be a course schedule, including date or time constraints, and the configuration prioritizes keyword or phrase extraction according to the date or time constraints. In some cases the text source may be a document, and the configuration may manage keyword or phrase extraction according to specific portions of the document, which may be sentences, paragraphs, pages or chapters.

In some embodiments the text source may be a real-time typing mechanism, and the configuration may manage keyword or phrase extraction by word, sentence, paragraph or page typed. In some embodiments the configuration may manage keyword or phrase extraction by time periodicity.

In some embodiments there may further be a mechanism for submitting keywords and phrases extracted from the text source to a search facility, and in some embodiments the configuration may manage submissions by time periods or structural characteristics of the text source. The structural characteristics might include sentences, paragraphs, pages, chapters, or subheadings.

In some cases there is connection to the Internet network, and submissions to the search facility are managed to occur in real time. Also in some cases keyword and phrase extraction occurs while unconnected to the Internet, and submissions are managed to be made at times connected to the Internet. In some embodiments there may be a mechanism for receiving and using results of searches done by the search facility using keywords or phrases extracted. Also in some embodiments the results displayed may be links to Internet-connected information sources found as a result of a search. In some cases the text source may be a real-time typing mechanism, and the search results are displayed proximate the typed text.

BRIEF DESCRIPTION OF THE DRAWING FIGURES

DETAILED DESCRIPTION

Figure 1:
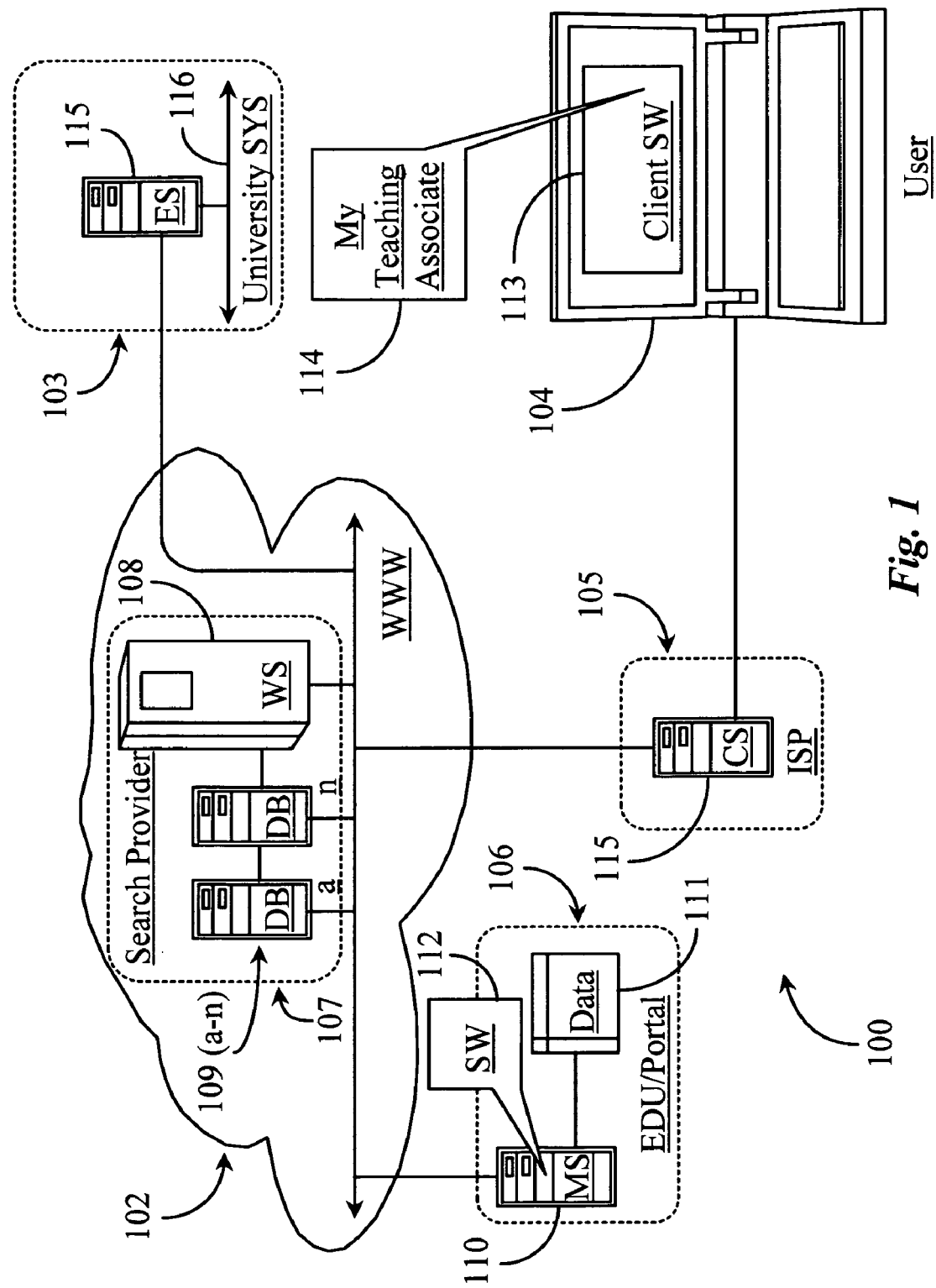
FIG. 1 is a block diagram illustrating a communications network wherein automated keyword aggregation and information search submission is practiced according to embodiments of the present invention.

FIG. 1 is a block diagram illustrating a communications network 100 wherein automated keyword aggregation and information search submission is practiced according to embodiments of the present invention. Communications network 100 includes a data packet network 102 illustrated herein as the well known world wide web (WWW) and will be referred to hereinafter as WWW 102. Network 102 may be another wide area network (WAN) other than the WWW such as a corporate Intranet, a private WAN, or a wireless municipal area network (MAN). The WWW is used in this example because of its public-access characteristics and because it has a wide geographic reach. Therefore, the practice of the present invention over the WWW is not geographically limited.

A search provider 107 is illustrated within the domain of WWW 102 and represents any service provider that enables information search services to clients accessing the WWW to perform such services. Search provider 107 may be an enterprise such as Google™, Yahoo™, Altavista™, or others.

Search provider 107 has a Web server (WS) 108 illustrated within its domain and directly connected to the WWW for communication. WS 108 is adapted to provide information search operations and to return information search results to users, typically in the form of hypertext transfer protocol language (HTML) electronic pages wherein those results are presented as a list of relevant hyperlinks to content that is relevant to search criteria entered by the users. Content results returned are typically compiled before presentation from content databases maintained by provider 107 and illustrated herein as databases 109(*a-n*) directly connected to WS 108 for data access and also connected in some embodiments to the WWW. The art of maintaining content for serving to users operating a search engine interface is well known and documented in the art. Therefore, detailed descriptions of the various methods for maintaining content-relevant links and content for information search services will not be provided here accept to say that in some cases search providers share databases and that some search providers maintain special content of a specific class for users to search as mentioned above in the background section.

Database 109*a*, for example, may contain links to WWW-based news articles from many WWW-based news services. Database 109*n*, for example, may contain links to WWW-based academia papers or research papers. Search provider 107 may provide users a special option when using a search engine to access links to information. For example, Google™ has recently provided a search engine option for searching links to research-based materials or other academically-related information, reports, articles, papers, and the like. The option is known as Google Scholar™. Providers also have options for culling returned links to more manageable numbers of links that are most relevant to the entered criteria.

A user 104 is illustrated in this example as a computer laptop icon representing a device commonly operated for Internet access and for conducting information searches of the WWW. In one embodiment, user 104 represents a student user operating client software 113 adapted for communicating with a university system illustrated in this embodiment as university system 103. Client software 113 may be a software application developed as a standalone or browser plug-in that enables user 104 to aggregate and organize his or her academic tasks.

University system 103 in this example operates on a campus area network, or a local area network 116 and supports at least one education server 115 connected to network 116 and also connected to WWW 102 for access and communication. User 104 has connection to WWW 102 through an Internet service provider (ISP) 105. The method of Internet connection may be dial-up, integrated services digital network (ISDN), digital subscriber line (DSL), or cable/modem connection wired or wireless. In this example, ISP 105 has a connection server 115 illustrated therein and adapted to connect customers like user 104 to the Internet.

An educational portal (EDU/Portal) 106 is illustrated in this example, and represents a service provider (known to the inventor) that provides software and communication brokering services to education customers like user 104. EDU/

Portal 106 has a main server 110 illustrated therein and directly connected to WWW 102 for data access and communication. Server 110 has a database 111 associated therewith. Database 111 may be adapted to contain client data including contact information, registration information, password information, and other client data. In one embodiment, EDU/Portal 106 helps user 104 running client software 113 to bridge services provided by university system 103 and other services that may be available over WWW 102 and may be subscribed to by user 104.

Main server 110 has a server application 112 illustrated thereon and adapted as a main application to client instance 113 running at user 104. In one embodiment, using client 113, which as described above may be a standalone application or a Web browser plug in, user 104 may aggregate and organize educational tasks, calendar information, and access tasks related to more than one separate learning system such as university system 103. University system server 115 may provide online course education to user 104. Likewise user 104 may engage in other online course education provided by still other educational servers not illustrated in this example. Without EDU/Portal 106, user 104 may be required to separately manage more than one online educational service or system with regard to scheduling, course completion, grade management, and so on.

EDU/Portal 106, may access university system 103, and more particularly ES 115 for the purpose of acquiring information from and submitting information to the server on behalf of the user. Likewise, EDU/Portal 106 may, in one embodiment, function as a proxy between user 104 and other Internet or WWW-based services. In one embodiment of the invention user 104 operating client software 113 may manage his online life and academic life through a same user interface.

Although the present architecture includes EDU/Portal 106, an intermediary service provider is not specifically required in order to practice the present invention. Likewise, user 104 may practice the present invention whether he or she is a student engaging in academia or not. The present example where user 104 is a student subscribing to educational services provided by university system 103 is for discussion purposes only as an example to enable clear description the present invention.

User 104 has a software capability provided in this example as a software option module 114 packaged with client software 113. Module 114 is known to 15 the inventor as "My Teaching Associate" or MYTA as an acronym. Module 114 may be provided as a software option in a software application like client software 113, or it may be provided as a plug in module to other software programs like word processors or electronic calendar applications in other embodiments. It may also be packaged as a standalone application running on laptop 104. In yet another embodiment module 114 may be provided as a server side implement at server 115 or at sever 110.

User 104 may connect online and may establish through navigation a direct connection to WS 108 or to ES 115 and partake in normally offered services without using MYTA 114 for any purpose. In this embodiment, user 104 may connect online and navigate to EDU/Portal 106, more particularly, to main server 110 and with the aid of MYTA 114, the user may engage services provided by search provider 107 in a way that is directly relevant to educational tasks the user may have related to university system 103.

MYTA 114 is an intelligent software module that can parse certain keywords or phrases from educational task descriptions that may be part of course descriptions, assignment tasks, or other requirements that may be pending in the calendar or schedule of user 104. In one embodiment, those keywords parsed may include certain proper nouns like book titles, authors, course titles, chapter titles, and proper nouns included in assignment descriptions. In one embodiment, certain phases may be parsed where those phrases are found in pertinent targeted descriptions. In addition, MYTA 114 can note and understand due date information associated with educational tasks.

MYTA 114 includes a search operation submitting engine (not illustrated) that can format the parsed data into one or more search queries for submission to a search provider like search provider 107. MYTA may perform this submission directly to WS 108 while user 104 is connected to WWW 102 through ISP 105. MYTA may also be configured to work in conjunction with EDU/Portal 106 such that search submissions may be performed for user 104 at such times when user 104 has no active connection to WWW 102. User 104 may connect online to WWW 102 and then navigate to EDU/Portal 106 and server 110. By activating MYTA user 104 may update his or her assignment schedule and course work requirements. According to user configuration, MYTA may be adapted to submit keyword searches ahead of any due dates for assignments or other educational tasks. Search results returned from a search provider like provider 107, for example, are saved for user 104 and are accessible from MS 110 the next time user 104 logs in to EDU/Portal 106. In the case of a direct online connection between user 104 and search provider 107, the search results are sent directly back to user 104 whereupon they may be displayed in a window adapted for the purpose within client application 113.

An advantage of enabling a proxy embodiment through EDU/Portal 106 is that new assignments or other educational tasks that user 104 may be responsible for may be discovered and one or more keyword aggregation and search submissions may be performed without requiring an online connection or direct involvement from user 104. In this case a server-side implementation 112 is used and MYTA 114 remains a client interface for receiving and displaying the information.

In one embodiment of the present invention, MYTA 114 also includes a real time keyword parser that may be tied to active user typed input when actively working on a document. In this case, user 104 may be actively taking notes or preparing an assignment using a word processor or a typing interface adapted for the purpose. The keyword aggregator has a real time mode that may be pre-configured according to several available options to actively parse, aggregate, and format those aggregated keywords into one or more search submissions conducted either while the user is typing or optionally during a pause between typing in the document.

The search results returned for each submission are displayed as hyperlinks to the content such that when activated, the content appears in a new browser window. The keyword aggregator may also be configured to parse phrases, keyword pairs, proper nouns, dates, numbers, names of people, names of places, or names of things. This is accomplished using a literary rules database containing constraints and other parameters governing the parsing process. All keyword aggregation and search operations are conducted, if the user is online, in the background enabling the user to continue working in a document without being distracted.

The methods and apparatus of the present invention enable a student, for example, to have relevant information available at the time that it may be required or desired or the purpose of optimizing assignment tasks in terms of efficiency and in terms of quality of work. There are many conceivable embodiments for student users and other user types that routinely complete assignments, articles, research, or other professional reporting requirements.

Figure 2:
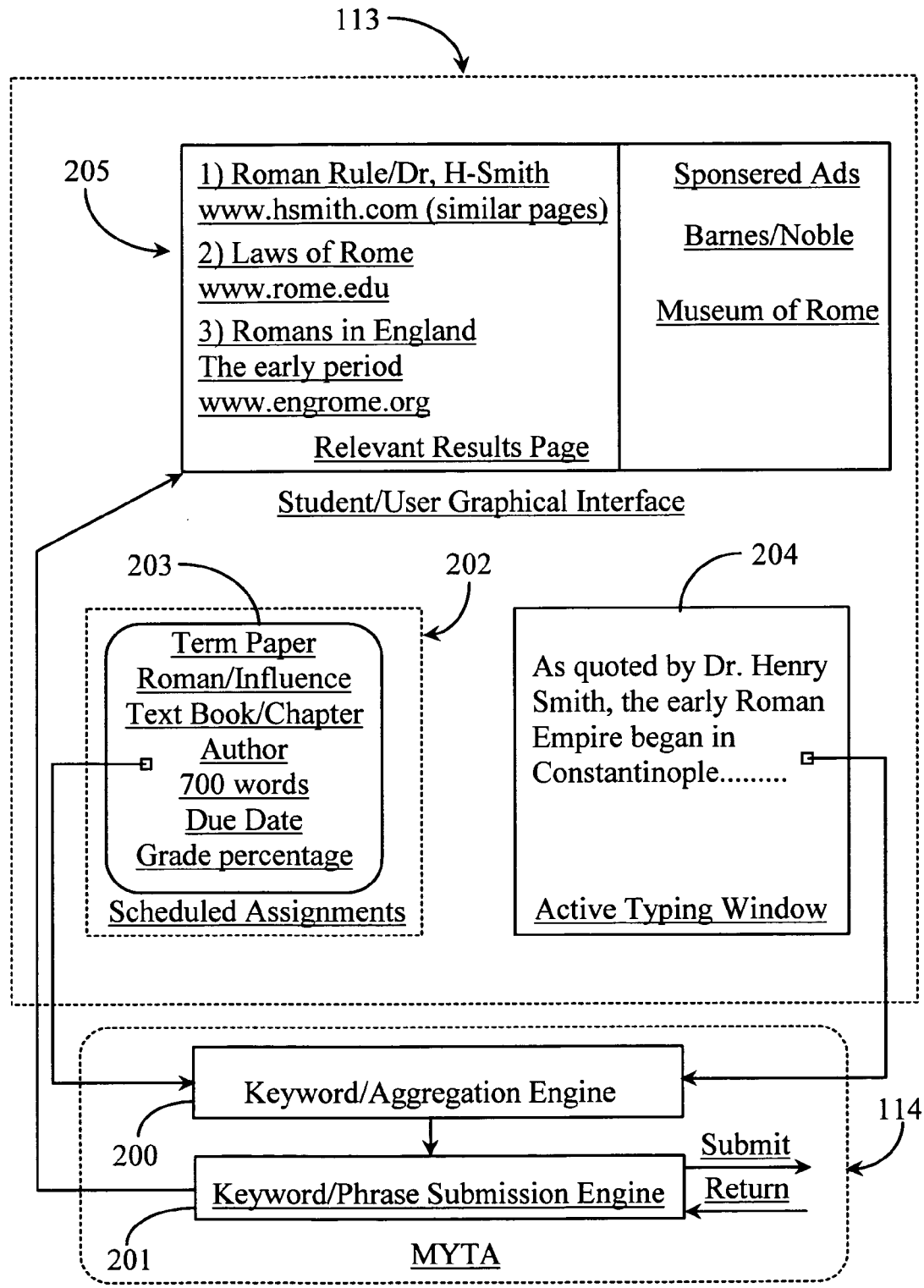
FIG. 2 is a block diagram illustrating a user interface adapted for dynamic keyword aggregation, submission and return of results according to an embodiment of the present invention.

FIG. 2 is a block diagram illustrating a user interface 113 and components of MYTA 114 adapted for dynamic keyword aggregation, submission and return of results according to an embodiment of the present invention. Interface 113 as described further above, may be a browser interface or a standalone educational interface adapted with Web browsing capability. Interface 113 has a scheduled assignments window 202 provided therein and adapted to display a user's schedule including, in this example, any pending assignments or tasks. A pending assignment 203 is illustrated in this example as one assignment that has been added to the schedule. Assignment 203 is, for purpose of discussion, a term paper. The subject is Roman influence. A textbook title and chapter title may be referenced as student textbook material that covers the subject of the assignment.

The author of the student textbook or other reference materials may be cited by name. The term paper may have a word count minimum requirement. The term paper may have a parseable due date, and an indication of the grade percentage of the class grade the paper is worth. MYTA 114 may be invoked from within interface 113 and when invoked, immediately refreshes to the user schedule. MYTA 114 has a keyword aggregation engine 200 provided thereto and adapted to take keywords from items 203 for eventual submission to a search provider. In this example, only useful and important keywords may be aggregated from assignment 203. For example, subject Roman influence may be parsed. The textbook title may be parsed. The name of a relevant author may be parsed. Using these keywords together, MYTA 114 may format the information into a relatively narrow search phrase to return any relevant information associated with the assignment subject.

A keyword/Phrase submission engine 201 is provided within MYTA 114 and adapted to forge a connection to a search provider server analogous to WS 108 described further above. During a search submission round, engine 201 sends a query formatted according to the search provider's required format and then receives any search results sent back as a result of the submission. The search results may appear in a separate window 205 labeled relevant results page. In this example, there are 3 listed hyperlinks to relevant content that a user may navigate to and analyze to see if that content might help with the pending assignment. In one embodiment, MYTA works in the background and the results are automatically saved as hyperlinks and displayed whenever the user expands the assignment for review or refresh. The results may be labeled MYTA research links. In some cases, MYTA 114 may even invoke certain hyperlinks to documents like .pdf files or the like in the background and may automatically save those files to the user's device in a pre-assigned folder linked to the assignment.

Interface 113 has an active typing window 204 provided therein and adapted, in this case for taking notes during a presentation, seminar, or class discussion. In one embodiment, window 204 may be a window to a word processing document that may be used to prepare papers. In either case, a user may configure MYTA 114 to take certain keyword types from the active window as they are typed in. For example, relevant keywords that might be leveraged from the existing text in window 204 may include "Dr. Henry Smith" "early Roman Empire" and "Constantinople". Aggregation engine 200 may take these keywords as they become available and may format them for query submission by engine 201. Window 204 may split into two windows in one embodiment whereupon the relevant search results similar to those shown in window 205 may appear in the second window, the first window remaining the typing interface. In one embodiment, the results may be sent to a separate window. MYTA 114 may be pre-configured to take keywords and perform one submission every other paragraph, each paragraph, one time per page, or according to some other directive. Using the real time active typing embodiment, the user is typically online and the results stream in as they become available. However, the user may type some pre-determined amount of words or paragraphs while off line, and then may go online during a pause to initiate the searching process. The search is performed in the background without requiring the user to navigate to a search page or to manually supply or configure a query. In addition to returned hyperlinks, advertisements (sponsored links) may also appear in window 205, in this case, Barnes and Noble and Museum of Rome. These may also be considered viable resources to a student even though ad relevancy in the case of sponsored links is performed by another system.

Figure 3:
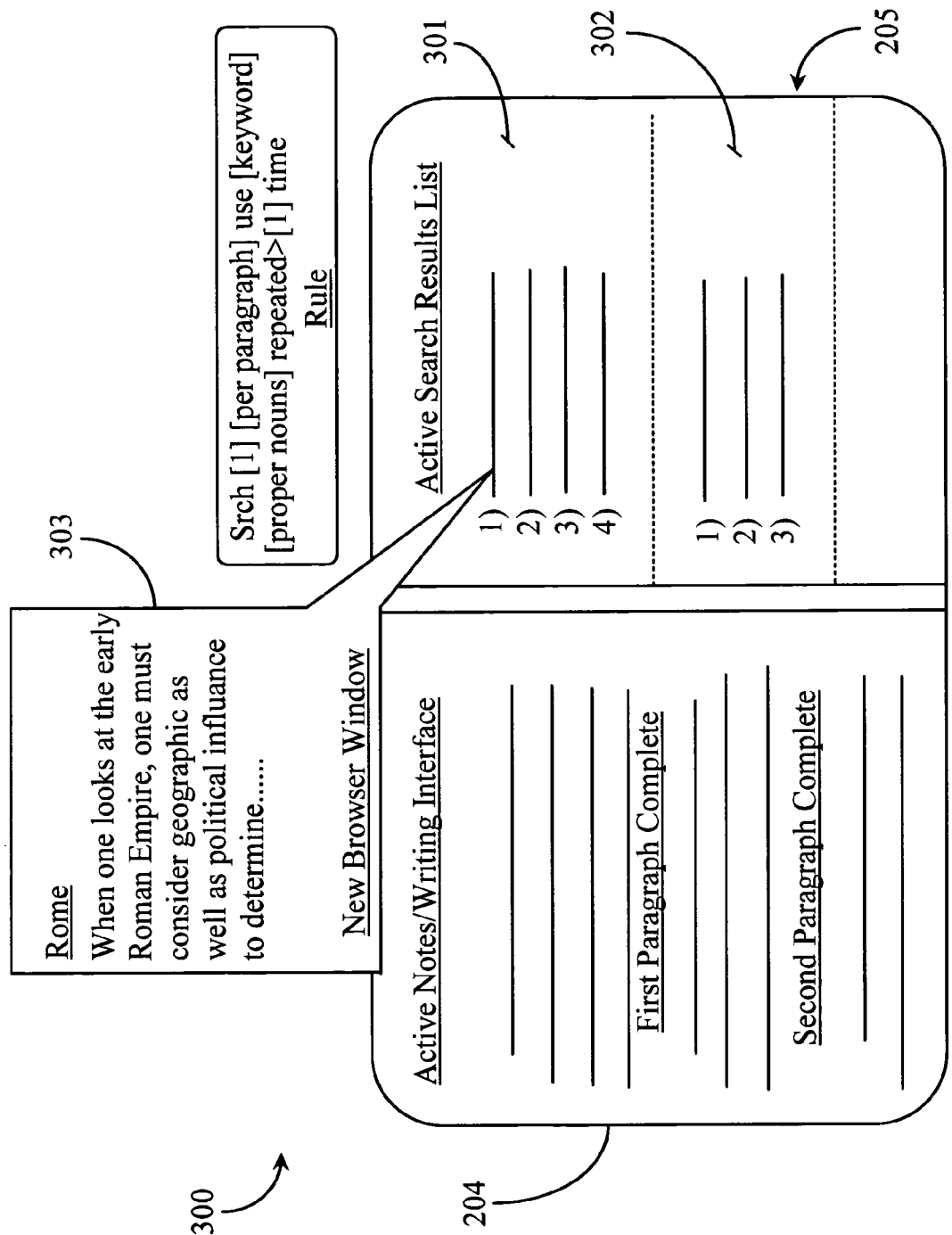
FIG. 3 is a block diagram illustrating dynamic keyword aggregation, submission, and search result return according to another embodiment of the present invention.

FIG. 3 is a block diagram illustrating writing interface 204 and results interface 205 according to one embodiment of the present invention. In this example, interface 204 is an active note-taking or writing interface as described in FIG. 2 above. Search results interface 205 appears as a second window, linked to interface 204 by result relevancy to content that is typed in the interface.

In interface 204 there are distinct paragraphs that are separated from each other. In this case a rule (illustrated above interface 205) is provided to govern the keyword aggregation and submission engines. The rule or constraint directs to search (Srch) one time per paragraph using keywords that are proper nouns and which are repeated in the paragraph at minimum one time. Therefore each time a proper noun is used more than one time, it is aggregated as a keyword to use for a search operation performed for that paragraph.

Interface 205 has a search result list 301 and a search result list 302 roughly corresponding in position to the associated paragraphs of text in interface 204. List 301 contains hyperlinks 1 through 4 to relevant content related to a keyword or keywords taken from the first paragraph typed into interface 204. Search result list 302 contains hyperlinks 1 through 3 to relevant content related to a keyword or keywords taken from the second paragraph typed into interface 204. Results returned to interface 205 might be optimized according to another rule designed to reduce the possible number of links returned. For example, a keyword Rome, used by itself is broad and may return many hyperlinks related in general to Rome. Therefore, by adding other relevant key words to Rome the scope of the search may be more narrowly defined and should return fewer links. Likewise, it may be defined by rule that only the top 5 links that are most relevant to the search criteria entered are returned in a given exchange.

If a user clicks on any of the returned links, a new browser window 303 may be triggered to open, connect to the content source address specified in the hyperlink and download the relevant content for display in the window. Although this method works in real time (links being delivered while typing still commences) it may also be conducted during a pause in writing. For example, the first paragraph may be completed and may automatically trigger the process of getting the keyword or words and submitting the keyword or words. If the user is off line, the software may automatically start the user's Internet connection software to connect. Once connected to the WWW, the keyword submission engine connects to the appropriate Web server and submits the query on behalf of the user in the background while the user is still typing. When finished receiving the results the user may terminate the connection or it may automatically terminate the session until the next round is needed.

Searching may be conducted with granularity down to once per sentence. However, depending on the content, broader searching may be conducted by paragraph, every 2 paragraphs, or once per page of input. In the schedule embodiment formerly described, a similar fine-tuning of granularity may be practiced. For example, instead of conducting a broad search using a course title only "Health", the system may add more keywords like to health like modern. An authors name and textbook title may be added as well as generic keywords that may be added to the formula like "news articles", "white papers". Phrasing like "definition of", or "description of" may also be inserted by the system to narrow a search to more relevant results. There are many possibilities.

What is claimed is:

1. A method comprising:
receiving by a computing device real-time textual input entered into a document to generate the document;
contemporaneously with entry of the real-time textual input, parsing the real-time textual input by the computing device in a background processing mode to aggregate keywords or phrases contained within the real-time textual input based on one or more parsing rules, and formatting by the computing device the aggregated keywords into one or more search submissions;
submitting by the computing device the one or more searches to a search facility distinct from the computing device;
receiving by the computing device search results responsive to the submitted searches; and
displaying by the computing device the search results.

2. The method of claim 1, wherein the displaying further comprises displaying by the computing device at least a first portion of the real-time textual input and the search results, the search results being displayed in proximity to the first portion of real-time textual input.

3. The method of claim 1, further comprising, prior to said submitting, determining by the computing device whether a connection to the search facility is available.

4. The method of claim 3, further comprising, in response to determining that the connection is not available, waiting until the connection becomes available and performing said submitting when the connection is available.

5. The method of claim 1, further comprising accessing or receiving by the computing device a textual source from a remote computer system, the remote computer system being separate and distinct from the computing device and the search facility.

6. The method of claim 5, further comprising:
extracting by the computing device additional keywords or phrases from at least a portion of the textual source based on additional one or more parsing rules;
submitting by the computing device the additional keywords or phrases to the search facility;
receiving by the computing device other search results responsive to the submitted additional keywords or phrases; and
displaying by the computing device the other search results with the search results.

7. The method of claim 6, wherein displaying the other search results with the search results further comprises displaying by the computing device the real-time textual input, the textual source, the search results, and the other search results in proximity to each other.

8. The method of claim 1, wherein parsing the real-time textual input includes using one or more parsing rules that include at least one of a part of speech associated with the keywords or phrases, an indication of whether keywords or phrases are repeated, or an indication of a part of a document to which the keywords or phrases belong.

9. An article of manufacture including a computer-readable medium having instructions stored thereon that, in response to execution by a computing device, cause the computing device to perform a method comprising:
aggregating keywords or phrases from real-time textual input into a textual source based on one or more parsing rules for parsing the real-time textual input;
formatting the aggregated keywords or phrases into one or more search submissions, the keywords or phrases aggregated in a background process contemporaneously with entry of the real-time textual input into the textual source to generate the textual source;
submitting the search submissions to a search facility, the search facility being separate and distinct from the computing device;
receiving search results responsive to the search submissions; and
displaying the textual source and search results, in proximity to the textual source to enhance the textual source.

10. The article of claim 9, wherein aggregating keywords or phrases includes using one or more parsing rules that include at least one of a part of speech associated with the keywords or phrases, an indication of whether keywords or phrases are repeated, and an indication of which part of a document the keywords or phrases belong to.

11. The article of claim 9, wherein the instructions, in response to execution, further cause the computing device to determine whether a connection to the search facility is available.

12. The article of claim 11, wherein the instructions, in response to execution, further cause the computing device to, in response to determining that the connection is not available, wait until the connection becomes available and perform said submitting when the connection is available.

13. The article of claim 9, wherein the instructions, in response to execution, further cause the computing device to;
access or receive another textual source from a remote computer system, the remote computer system being separate and distinct from the computing device and the search facility;
extract additional keywords or phrases from at least a portion of the another textual source based on additional one or more parsing rules;
submit the additional keywords or phrases to the search facility;
receive other search results responsive to the submitted additional keywords or phrases; and
display the other search results with the search results.

14. The article of claim 13, wherein the instructions to display the other search results with the search results are further configured to display the textual sources, the search results, and the other search results in proximity to each other.

15. An apparatus comprising:
a processor; and
logic configured to be operated by the processor to:
receive real-time textual input being entered into a document to generate the document;
contemporaneously with the real-time textual input being entered into the document, aggregate in a background process keywords or phrases from the real-time textual input based on one or more parsing rules, and format the aggregated keywords or phrases into search submissions;

submit the search submissions to a search facility;

receive search results responsive to the search submissions; and display the search results.

16. The apparatus of claim 15, wherein the logic is further configured to:

access or receive a textual source from a remote computer system;

extract additional keywords or phrases from at least a portion of the textual source based on additional one or more parsing rules;

submit the additional keywords or phrases to the search facility;

receive other search results responsive to the submitted additional keywords or phrases; and display the other search results with the search results.

17. An apparatus comprising:

means for receiving real-time textual input entered into a textual source to generate the textual source;

means for parsing the real-time textual input into keywords or phrases;

means for aggregating the keywords or phrases based on one or more parsing rules for parsing the real-time textual input;

means for formatting the aggregated keywords or phrases into search submissions, wherein the aggregating and formatting means are configured to operate as a background process, contemporaneously with entry of the real-time textual input being entered into the textual source;

means for submitting the search submissions to a search facility, the search facility being separate and distinct from the apparatus;

means for receiving search results responsive to the search submissions; and means for displaying the textual source and search results in proximity to the textual source to enhance the textual source.

18. The apparatus of claim 17, further comprising means for determining whether a connection to the search facility is available.

19. The method of claim 1, wherein the parsing and formatting occur in real-time with the entry of the real-time textual input.

20. The article of claim 9, wherein the formatting and aggregating occur in real-time with the entry of the real-time textual input.

21. The apparatus of claim 15, wherein the logic is further configured to format and aggregate in real-time with entry of the real-time textual input.

22. The apparatus of claim 17, wherein the means for formatting and means for aggregating are configured to operate in real-time with entry of the real-time textual input.

* * * * *

UNITED STATES PATENT AND TRADEMARK OFFICE
CERTIFICATE OF CORRECTION

| | | |
|---|---|---|
| PATENT NO. | : 8,037,041 B2 | Page 1 of 1 |
| APPLICATION NO. | : 11/400002 | |
| DATED | : October 11, 2011 | |
| INVENTOR(S) | : Gupta | |

It is certified that error appears in the above-identified patent and that said Letters Patent is hereby corrected as shown below:

Column 1, line 12, delete "it's" and insert -- its --.

Column 10, line 43, in Claim 13, delete "device to;" and insert -- device to: --.

Column 10, line 64, in Claim 15, delete "document," and insert -- document; --.

Signed and Sealed this
Seventeenth Day of April, 2012

David J. Kappos
*Director of the United States Patent and Trademark Office*